United States Patent
Kern et al.

(10) Patent No.: US 12,305,711 B2
(45) Date of Patent: May 20, 2025

(54) ROLLING-ELEMENT BEARING

(71) Applicant: AKTIEBOLAGET SKF, Gothenburg (SE)

(72) Inventors: Christoph Kern, Aschach/Steyr (AT); Emmanuel Pichlmaier, Seckau (AT); Alfred Schwappach, Bundorf (DE); Jens Bergmann, Bergrheinfeld (DE)

(73) Assignee: AKTIEBOLAGET SKF, Gothenburg (SE)

( * ) Notice: Subject to any disclaimer, the term of this patent is extended or adjusted under 35 U.S.C. 154(b) by 70 days.

(21) Appl. No.: 18/130,451

(22) Filed: Apr. 4, 2023

(65) Prior Publication Data

US 2023/0323918 A1   Oct. 12, 2023

(30) Foreign Application Priority Data

Apr. 11, 2022   (DE) .......................... 102022203633.6

(51) Int. Cl.
*F16C 33/76*     (2006.01)
*F16C 19/38*     (2006.01)
(Continued)

(52) U.S. Cl.
CPC .......... *F16C 33/768* (2013.01); *F16C 19/385* (2013.01); *F16C 33/586* (2013.01); *F16C 33/7823* (2013.01); *F16C 33/783* (2013.01); *F16C 33/7886* (2013.01); *F16C 33/7896* (2013.01); *F16C 35/077* (2013.01); *F16C 33/7813* (2013.01); *F16C 2320/23* (2013.01)

(58) Field of Classification Search
CPC ...... F16C 19/28; F16C 19/383; F16C 19/385; F16C 19/386; F16C 33/583; F16C 33/586; F16C 33/60; F16C 33/768; F16C 33/782; F16C 33/7823; F16C 33/783; F16C 33/7886; F16C 33/7896; F16C 27/066; F16C 35/067; F16C 35/077; F16J 15/02–108; F16J 15/32–3236
See application file for complete search history.

(56) References Cited

U.S. PATENT DOCUMENTS 5,653,447 A * 8/1997 Cress ..................... F16L 55/115
                                                          277/648

FOREIGN PATENT DOCUMENTS

DE   19831302 A1 *  1/2000  ............ F16C 19/385
EP    1970582 A2 *  9/2008  .......... F16C 29/0676
(Continued)

OTHER PUBLICATIONS

Machine Translation of JP-H08184313-A (Year: 1996).*
(Continued)

*Primary Examiner* — Alan B Waits
(74) *Attorney, Agent, or Firm* — J-TEK LAW PLLC; Scott T. Wakeman; Mark A. Ussai

(57) ABSTRACT

An axially supporting rolling-element bearing of a rolling mill shaft includes an inner ring having a raceway, an outer ring having a raceway and a plurality of rolling elements on the raceways between the rings. An outer surface of the outer ring includes an opening such as a groove that faces radially outward and contains a seal element. The seal element includes a seal lip that extends out of the groove. When the rolling element bearing is placed in a bore of a housing, the outer ring is spaced from the bore by the seal element.

7 Claims, 4 Drawing Sheets

(51) Int. Cl.
*F16C 33/38* (2006.01)
*F16C 33/58* (2006.01)
*F16C 33/78* (2006.01)
*F16C 35/07* (2006.01)
*F16C 35/077* (2006.01)

(56) References Cited

FOREIGN PATENT DOCUMENTS

| FR | 2969237 | A1 | * | 6/2012 | ............ F16C 33/768 |
|----|---------|----|---|--------|--------------------------|
| JP | H08184313 | A | * | 7/1996 | |
| JP | 2000081035 | A | * | 3/2000 | ............ F16C 19/386 |
| JP | 2007032586 | A | * | 2/2007 | ............ F16C 33/768 |
| JP | 2009216139 | A | * | 9/2009 | |
| JP | 2016223460 | A | * | 12/2016 | |

OTHER PUBLICATIONS

Machine Translation of DE-19831302-A1 (Year: 2000).*
Machine Translation of JP-2000081035-A (Year: 2000).*
Machine Translation of JP-2007032586-A (Year: 2007).*
Machine Translation of EP-1970582-A2 (Year: 2008).*
Machine Translation of JP-2009216139-A (Year: 2009).*
Machine Translation of FR-2969237-A1 (Year: 2012).*
Machine Translation of JP-2016223460-A (Year: 2016).*

* cited by examiner

ROLLING-ELEMENT BEARING

CROSS-REFERENCE

This application claims priority to German patent application no. 10 2022 203 633.6 filed on Apr. 11, 2022, the contents of which are fully incorporated herein by reference.

TECHNOLOGICAL FIELD

The present invention relates to a rolling-element bearing.

BACKGROUND

Rolling-elements are used, among other things, for rotatably supporting a shaft. Depending on the application, it can be necessary to support the shaft not only radially, but also axially. Here, for example, a combination of at least one bearing supporting the shaft radially and at least one bearing supporting the shaft axially can be used.

In order to axially support the shaft, a purely axial bearing can be used, i.e., a bearing that is configured to only support axial loads, or in the alternative, a bearing can be used that is configured to support both axial and radial loads. However, in order to prevent a bearing that is configured to support combined axial and radial loads from also supporting radial loads when it is to be used only as a purely axial bearing, it can be necessary to provide a gap in a radial direction between the bearing and a housing that receives the bearing so that no forces can be transmitted in the radial direction between the bearing and the housing.

However, in order to prevent a lubricant from escaping from the bearing through the gap and/or to prevent contaminants from entering the bearing through the gap it is necessary to seal the gap with a suitable seal element, without, however, allowing the seal element to transmit a radial force against the housing.

SUMMARY

It is therefore an aspect of the present disclosure to provide a rolling-element bearing with an improved seal element that allows the rolling-element bearing to be used as an axial bearing.

In the following, a rolling-element bearing for an axial bearing assembly of a shaft is disclosed. For example, the supported shaft can be used in a rolling mill. Here the rolling-element bearing is receivable in a housing. Furthermore, the rolling-element bearing includes at least one inner ring, at least one outer ring, and a plurality of rolling elements that are disposed in a bearing interior between the inner and the outer ring. The rolling elements can be balls, cones, and/or rollers. Furthermore, the rolling-element bearing can be single row or multi-row. Furthermore, at least one opening is provided on the radial outer surface of the outer ring.

In order to allow the rolling-element bearing to be used as an axial bearing, a seal element with at least one seal lip is disposed in the at least one opening. The seal lip is configured to radially abut against the housing in an installed state of the seal element. The seal element can thereby form a seal without transmitting a radial load to the housing.

The seal element preferably includes a base section from which the at least one seal lip projects radially or at least in a direction that has a radial component. This makes possible a stable and secure receiving of the seal element in the at least one opening. Furthermore, the seal element can be produced by turning or by an injection molding method.

According to one preferred embodiment, the opening is formed as a groove, and the base section lies in the groove, wherein the base section has a flat bottom surface. Due to the flat bottom surface, in particular a behavior of the seal element during an installation of the rolling-element bearing into the housing can be improved, and a more stable seat of the seal element in the groove can be ensured.

Furthermore, the at least one seal lip can comprise a free end on which at least one chamfer is provided, the at least one chamfer being configured to allow a movement of the at least one seal lip into the at least one opening during the insertion of the rolling-element bearing into the housing. It can thereby be ensured that during the insertion of the rolling-element bearing into the housing, the seal element remains in its intended position.

In order to prevent a loss of lubricant through the gap, the at least one seal lip is preferably configured to seal against the bearing interior. Alternatively the at least one seal lip can be configured to seal against a bearing exterior in order to prevent a penetration of contaminants into the bearing.

According to a further preferred embodiment, the seal element includes at least one second seal lip. For example, the first seal lip can be configured to seal against the bearing interior, and the second seal lip can be configured to seal against the bearing exterior. This makes it possible, with only one seal element, to both reduce the loss of lubricant and to prevent a penetration of contaminants into the bearing.

Furthermore, the rolling-element bearing can be a multi-row rolling-element bearing that includes at least one first row and one second row of rolling elements, wherein at least the outer ring is configured as a two-part ring, wherein the first row of rolling-elements is disposed between the at least one inner ring and a first part of the outer ring, and the second row of rolling-elements is disposed between the at least one inner ring and a second part of the outer ring, wherein the first and the second part of the outer ring each have an opening on the radial outer surface of the outer ring in which a seal element with at least one seal lip is disposed, which seal element is configured to radially abut against the housing.

On the respective radial outer surface, the first and the second part of the outer ring can preferably each have a second opening in which a second seal element with at least one seal lip is disposed, which seal element is configured to radially abut against the housing. This makes it possible to reliably protect the bearing interior from lubricant loss and from the penetration of contaminants. For example, the first seal element can be configured to seal against the bearing interior, and the second seal element can be configured to seal against the bearing exterior.

The seal element is preferably produced from an elastomer material, such as, for example, nitrile rubber, hydrogenated nitrile rubber (HNBR), and/or fluororubber (FKM).

According to a further aspect, a shaft bearing assembly with a shaft and a housing is disclosed, in particular for a rolling mill. Here at least one radially supporting rolling-element bearing is provided in the housing that is configured to support the shaft radially, and at least one axially supporting rolling-element bearing is provided that is configured to support the shaft axially, wherein a gap is provided between the housing and a radially outer surface of the axially supporting rolling-element bearing so that the rolling-element bearing is not supported radially. Here at least one opening is provided on the radial outer surface of the axially supporting rolling-element bearing, wherein in the at least one opening a seal element with at least one seal lip is disposed that is configured to seal the gap.

The axially supporting rolling-element bearing is preferably configured like the above-described rolling-element bearing.

A further embodiment comprises an axially supporting rolling-element bearing of a rolling mill shaft that includes at least one inner ring, at least one outer ring, and a plurality of rolling elements disposed in a bearing interior between the at least one inner ring and the at least one outer ring. The at least one inner ring includes at least one raceway on a radially outer surface, and the at least one outer ring includes at least one raceway on a radially inner surface facing the at least one raceway of the at least one inner ring and at least one radially outwardly facing opening on a radially outer surface. At least one seal element is mounted in the at least opening and includes at least one seal lip. The at least one seal lip projects outward from the at least one opening in a direction having a radial component.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
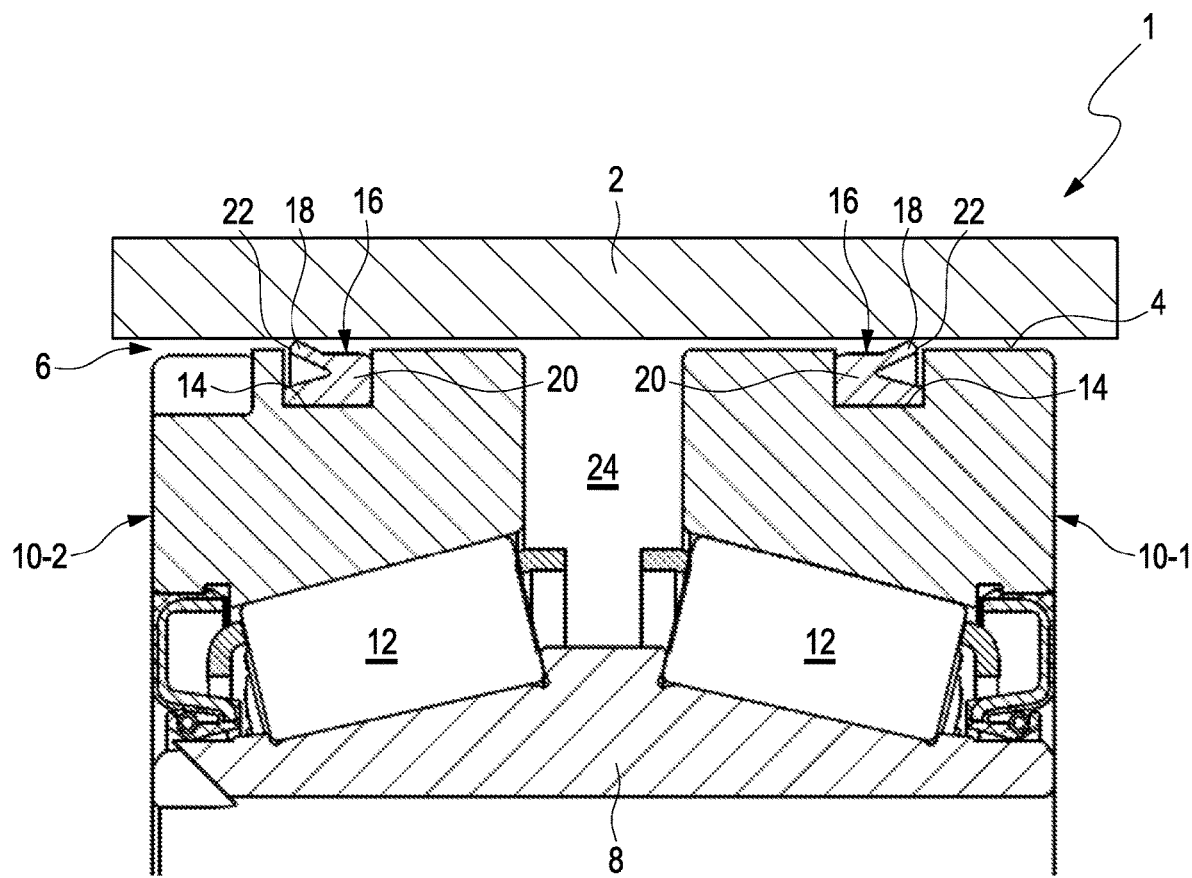
FIG. 1 is a cross-section through a rolling-element bearing according to an embodiment of the present disclosure.
Figure 7:
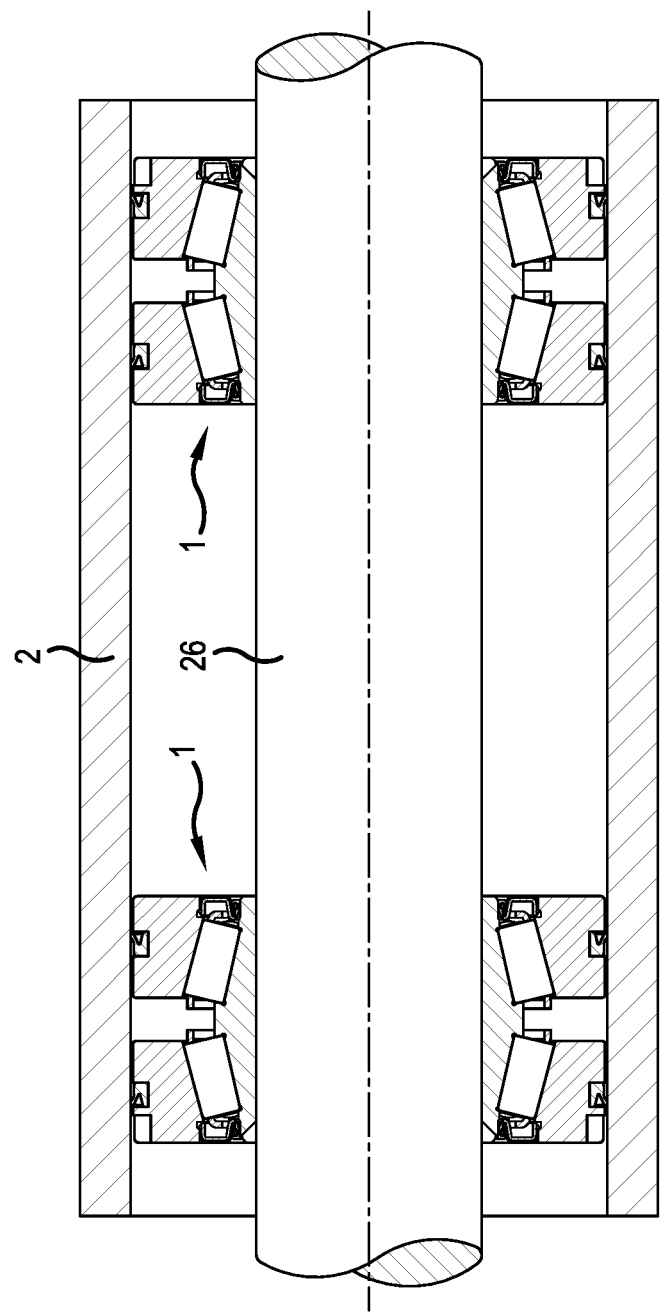
FIG. 7 is a cross-section through a first assembly that includes a shaft supported in a housing by two of the rolling-element bearings according to claim 1.

FIGS. 1 and 7 show a rolling-element bearing 1, in particular for an axial bearing assembly of a shaft 26. For example, the supported shaft 26 can be used in a rolling mill. Here the rolling-element bearing 1 is received in a housing 2, and a gap 6 is provided between the housing 2 and a radial surface 4 of the rolling-element bearing 1 facing the housing so that the rolling-element bearing 1 is not radially supported.

In FIG. 1, the rolling-element bearing 1 is a tapered roller bearing with a one-part inner ring 8 and a two-part outer ring 10-1, 10-2. Of course, the outer ring 10 can also be configured one-part, and/or the inner ring 8 can be configured two-part. In FIG. 1, the rolling-element bearing 1 shown is a double row bearing in which the first row of rolling elements 12 are disposed between the inner ring 8 and the first part of the outer ring 10-1, and the second row of rolling elements 12 are disposed between the inner ring 8 and the second part of the outer ring 10-2. However, the rolling-element bearing can also be a single row bearing, or a bearing with more than two rows of rolling elements. Furthermore, in addition to cones, other types of rolling elements can be used, such as, for example, balls, rollers, etc. This means that the rolling-element bearing 1 can be any other type of rolling-element bearing that is configured to support axial loads in addition to radial loads.

In the radial surface 4 facing the housing 2, an opening 14 is respectively provided both in the first part 10-1 of the outer ring and the second part 10-2 of the outer ring. In each of the openings 14, a seal element 16 with a seal lip 18 is disposed that is configured to radially abut against the housing 2. The seal lip 18 can thereby seal the gap 6 that exists between the housing 2 and the radial surface 4 of the rolling-element bearing 1 facing the housing 2 without transmitting a radial load onto the housing so that the use of the rolling-element bearing 1 only as an axial bearing is made possible.

The seal element 16 includes a base section 20 from which the seal lip 18 projects radially or in a direction that includes a radial component. In FIG. 1, the opening 14 is configured as a groove, and the base section 20 lies in the groove. Here the base section 20 has a flat bottom surface so that during the installation of the rolling-element bearing 1 in the housing 2, the probability that the seal element 16 releases from the opening 14 can be reduced.

The seal element 16 is preferably produced from an elastomer material, such as, for example, nitrile rubber, hydrogenated nitrile rubber (HNBR), and/or fluororubber (FKM). Furthermore, the seal element 16 can be produced by an injection molding method and/or by turning.

The seal lip 18 has a free end on which a chamfer 22 is provided, the chamfer being configured to allow the seal lip 18 to move into (be compressed into) the opening 14 during the insertion of the rolling-element bearing 1 into the housing 2. It can thereby be ensured that the seal element 16 remains at its intended position during the insertion of the rolling-element bearing 1 into the housing 2.

Figure 2:
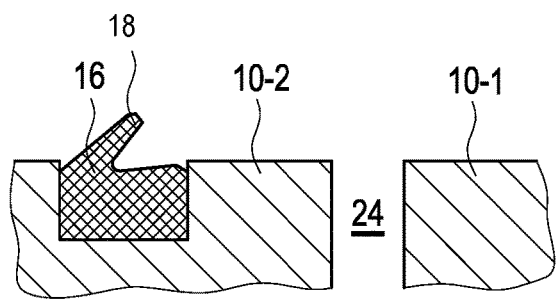
FIG. 2 is a detail view of a portion of one of the outer rings of FIG. 1 showing a first alternate embodiment of a seal element according to the present disclosure.
Figure 3:
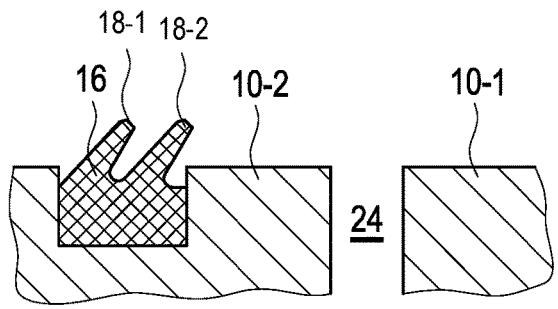
FIG. 3 is a detail view of a portion of one of the outer rings of FIG. 1 showing a second alternate embodiment of a seal element according to the present disclosure.
Figure 4:
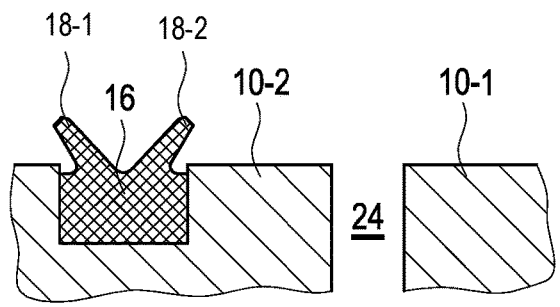
FIG. 4 is a detail view of a portion of one of the outer rings of FIG. 1 showing a third alternate embodiment of a seal element according to the present disclosure.

In FIG. 1, the seal lip 18 is disposed such that the seal element 16 seals against an entry of material from outside the bearing. In other words, the acute angle formed by the seal lip 18 and the base section 20 faces in the direction of the bearing exterior. Alternatively, as shown in FIG. 2, the seal lip 18 can also be disposed such that the seal element 16 seals against an escape of material from the bearing interior 24. In other words, the acute angle formed by the seal lip 18 and the base section 20 faces in the direction of the bearing interior. Furthermore, the seal element 16 can also be provided with two seal lips 18-1, 18-2 as shown in FIGS. 3 and 4. The seal lips 18-1, 18-2 can face in the same direction, as shown in FIG. 3, to seal against an escape of material from the bearing interior, or, as shown in FIG. 4, a first one of the seal lips 18-1 can seal against an entry of material from the bearing exterior while the second seal lip 18-2 is configured to seal against an escape of material from the bearing interior. This makes it possible, with only one seal element 16, to both reduce the loss of lubricant and to prevent a penetrating of contaminants into the bearing.

Figure 5:
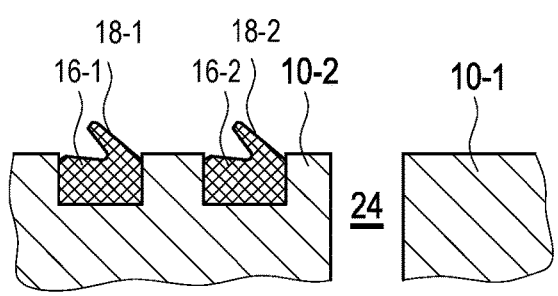
FIG. 5 is a detail view of a portion of one of the outer rings of FIG. 1 showing a first seal arrangement that includes two seal elements on one of the outer rings of FIG. 1.
Figure 6:
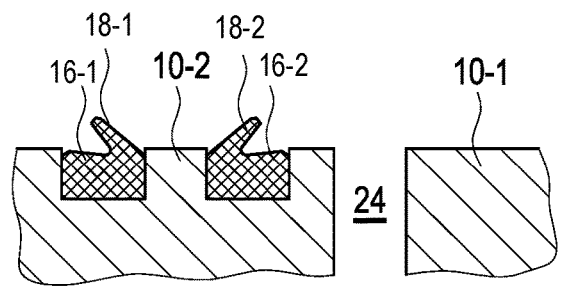
FIG. 6 is a detail view of a portion of one of the outer rings of FIG. 1 showing a second seal arrangement that includes two seal elements on one of the outer rings of FIG. 1.

Alternatively or additionally, the radial surface 4 facing the housing the first and the second part of the outer ring 10-1, 10-2 can each include a second opening as shown in FIGS. 5 and 6 in which a first seal element 16-1 and a second seal element 16-2 are disposed, each of which includes a seal lip 18-1, 18-2, respectively. The first and second seal lips 18-1, 18-2 can both face in the same direction to seal against the entry of material from the outside of the bearing (FIG. 5) or can face in opposite directions as shown in FIG. 6. This makes it possible to reliably protect the bearing interior 24 from lubricant loss and the penetrating of contaminants.

Figure 8:
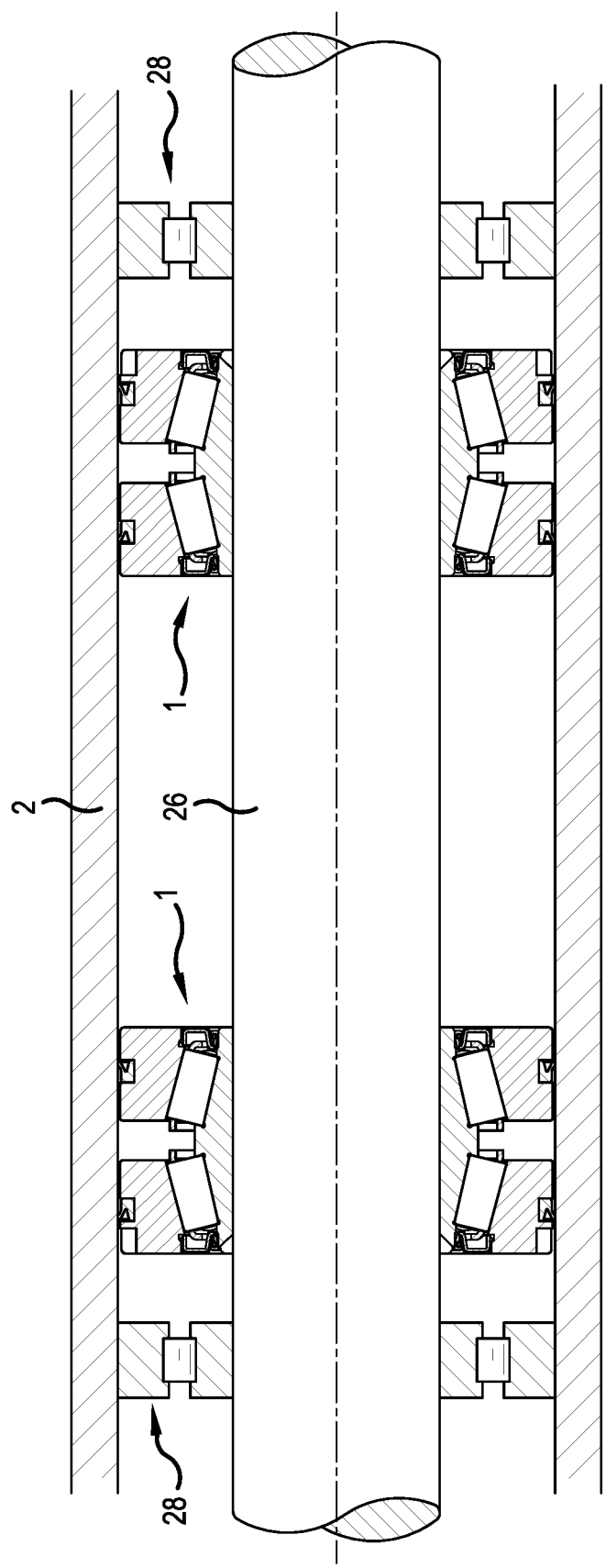
FIG. 8 is a cross-section through a second assembly that includes a shaft supported in a housing by two of the rolling-element bearings according to claim 1 and by two radially supporting bearings.

As shown in FIG. 8, the shaft 26 can be supported by first and second radially supporting rolling element bearings 28 having cylindrical rollers while the rolling element bearings 1 provide only axial support.

In summary, providing a seal element 16 with a seal lip 18 that radially abuts against the housing 2 to seal the gap 6 between rolling-element bearing 1 and the housing provides a seal solution in which the rolling-element bearing 1 continues to be unsupported radially and therefore can function as an axial bearing. Due to the flexibility of the seal lip 18, it can also be ensured that during the insertion of the rolling-element bearing 1 into the housing, the seal element 16 remains in its position in the opening 14 and is not stripped out.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. An assembly comprising:
    a housing having a bore defined by a cylindrical inner surface,
    a shaft radially supported in the bore by a radially supporting rolling-element bearing, and
    an axially supporting rolling-element bearing mounted on the shaft in the bore, the rolling-element bearing comprising:
       at least one inner ring,
       at least one outer ring, and
       a plurality of rolling elements disposed in a bearing interior between the at least one inner ring and the at least one outer ring,
       wherein the at least one inner ring includes at least one raceway on a radially outer surface,
       wherein the at least one outer ring includes at least one raceway on a radially inner surface facing the at least one raceway of the at least one inner ring and at least one radially outwardly facing opening on a radially outer surface,
       wherein at least one seal element is mounted in the at least one opening, the at least one seal element including at least one seal lip,
       wherein the at least one seal element includes a first seal element having a base section and a seal lip projecting from the base section, an inner end of the seal lip of the first seal element being located at the base section and an outer end of the seal lip of the first seal element being separated from the base section by a seal lip gap, and
       wherein the seal lip of the first seal element projects outward from the at least one opening in a direction having a radial component,
    wherein the seal lip of the first seal element is in contact with the cylindrical inner surface,
    wherein the radially outermost surface of the at least one outer ring is spaced from the cylindrical inner surface by a radial gap, and
    wherein the direction has an axial component.

2. The assembly according to claim 1,
    wherein at least a portion of the seal lip of the first seal element is located in the radial gap.

3. The assembly according to claim 1,
    wherein the at least one outer ring comprises a first outer ring and a second outer ring,
    wherein the at least one opening comprises a first circumferentially extending groove in the first outer ring and a second circumferentially extending groove in the second outer ring,
    wherein the first seal element is located in the first circumferentially extending groove and the at least one seal element includes a second seal element in the second circumferentially extending groove, and
    wherein the base section of the first seal element is mounted in the first circumferentially extending groove and includes a flat radially inner surface and wherein a base section of the second seal element is mounted in the second circumferentially extending groove and includes a flat radially inner surface.

4. The assembly according to claim 3,
    wherein the first seal element and the first circumferentially extending groove are configured such that the outer end of the at least one seal lip can be pressed radially into the first circumferentially extending groove.

5. The assembly according to claim 4
    wherein the outer end of the seal lip of the first seal element includes a chamfer.

6. The assembly according to claim 1,
wherein the at least one seal element is configured to form a seal with the cylindrical inner surface of the housing without transmitting a radial load from the at least one outer ring to the housing.

7. The assembly according to claim 1,
wherein the radially supporting rolling-element bearing and the at least one seal element are configured such that the seal lip of the first seal element forms a seal with the cylindrical inner surface of the housing without transmitting a radial load from the at least one outer ring to the housing.

* * * * *